United States Patent
Young

(12) 
(10) Patent No.: US 7,113,078 B2
(45) Date of Patent: Sep. 26, 2006

(54) EMERGENCY LIGHTS FOR TOWED VEHICLES

(76) Inventor: Allan Wymer Young, P.O. Box 291142, Tampa, FL (US) 33687

( * ) Notice: Subject to any disclaimer, the term of this patent is extended or adjusted under 35 U.S.C. 154(b) by 96 days.

(21) Appl. No.: 10/880,140

(22) Filed: Jun. 30, 2004

(65) Prior Publication Data

US 2006/0001529 A1    Jan. 5, 2006

(51) Int. Cl.
*G08B 21/00* (2006.01)

(52) U.S. Cl. ..................... 340/431; 307/10.7

(58) Field of Classification Search ............... 340/431, 340/687, 686.1, 693.1, 693.2, 333; 307/10.8, 307/10.7

See application file for complete search history.

(56) References Cited

U.S. PATENT DOCUMENTS

| 3,585,582 | A | * | 6/1971 | Dove | 340/431 |
| 5,515,025 | A | * | 5/1996 | Barrows | 340/431 |
| 5,596,944 | A | * | 1/1997 | Massie | 116/28 R |
| 5,719,552 | A | * | 2/1998 | Thompson | 340/431 |
| 5,775,712 | A | * | 7/1998 | Link et al. | 280/422 |
| 6,130,487 | A | * | 10/2000 | Bertalan et al. | 307/9.1 |
| 6,417,579 | B1 | * | 7/2002 | Lehnst et al. | 307/10.7 |
| 6,525,654 | B1 | * | 2/2003 | Siggers | 340/438 |
| 6,545,600 | B1 | * | 4/2003 | Boner | 340/468 |

* cited by examiner

*Primary Examiner*—John Tweel, Jr.

(57) ABSTRACT

An emergency lighting system that can be used on any vehicle where the standard lighting system installed on the vehicle is malfunctional, especially at the rear of the vehicle, due to shorting out or other causes. The emergency lights consist of units having various colored lights therein, such as red, white or yellow that are normally recognized in any traffic pattern. The lights can be operated from the standard battery of the vehicle or can be switched to a battery system contained in the light units. This is especially true in vehicles towing a boat or a trailer. When the boat is launched into the water, the lights on the trailer may be submerged into the water thereby shorting out the electrical system. This renders the towed vehicle illegal in traffic on the highway because the rear lights are not functioning. The inventive concept of this invention solves the above noted problem.

5 Claims, 4 Drawing Sheets

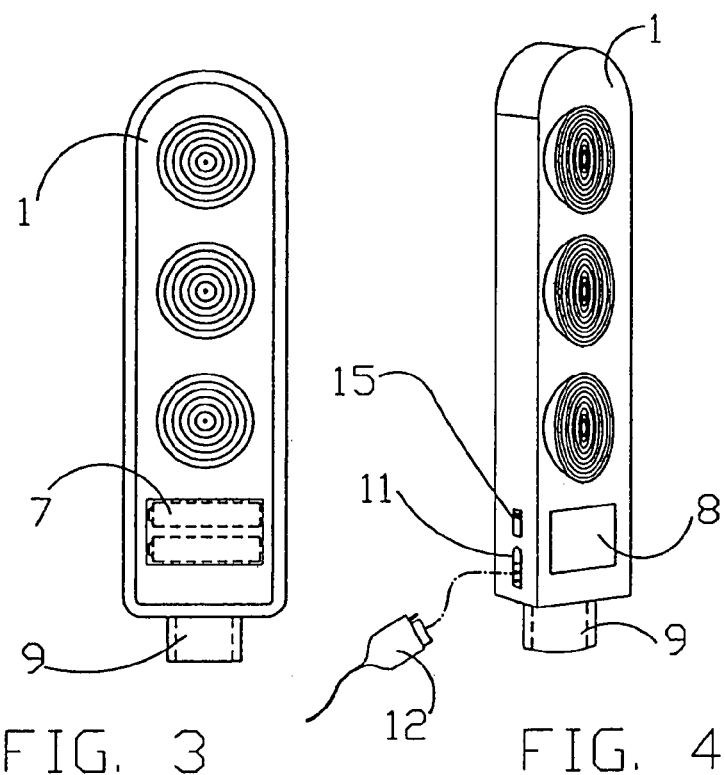
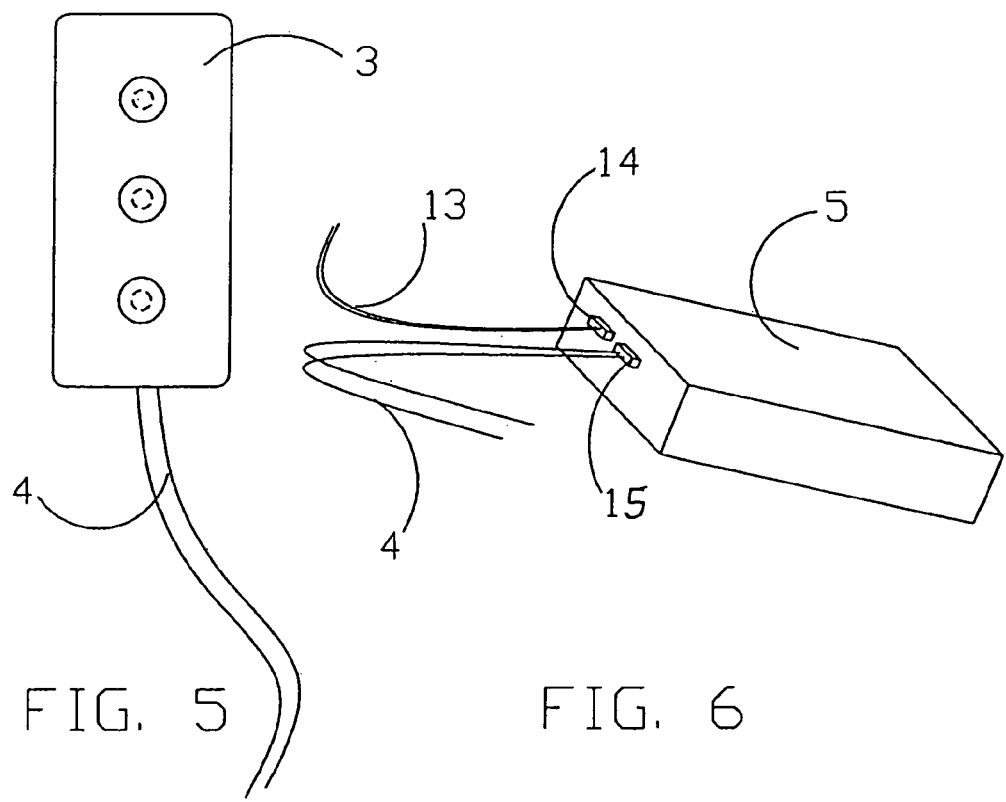

1. Light unit rear view
9. Flange
10. Connector

1. Light unit Front view
8. Battery cover
9. connected with minimum connector to create one small unit.

EMERGENCY LIGHTS FOR TOWED VEHICLES

BACKGROUND OF THE INVENTION

This invention discloses and claims an emergency light system to be installed on a trailer that is towing a boat. It is a well known fact that when a boat is being launched into the water on a ramp that the rear end of the trailer with the boat thereon is being submerged in the water until the boat can float. The reverse is true also when the boat is being retrieved from the water whereby the trailer is being submerged again until it is located under the boat. Once the boat is fastened to the trailer the towing vehicle can now pull the trailer with the boat thereon from the water. The problem is that when the trailer is repeatedly submerged in the water, the electrical system may get water soaked thereby short out the rear lights that are used to establish rear lights, brake lights or flasher lights which would render the vehicle illegal to be driven on the highway. The present invention is designed to elevate the above noted problems.

SUMMARY AND OBJECTS OF THE INVENTION

It is very important that the lights on the vehicles, especially the rear lights of the towed vehicle continue to operate after the towed vehicle, that is, the trailer carrying the boat, has been submerged in the water, because, after having been submerged, may not operate anymore because of having been shorted out by the water and cannot continue to operate. Therefore, a substitute lighting system has to be developed that will help the vehicle-trailer train to continue on its path so that the vehicle train will be in compliance with highway requirements with regard to lighting systems on vehicles. Consequently, the inventive design does overcome the disadvantage of shorting out lights on vehicles.

BRIEF DESCRIPTION OF THE DRAWINGS

FIG. 3 is a perspective view of a rear light to be installed on a towed vehicle;

FIG. 4 is a front view of the light of FIG. 3

FIG. 5 illustrates a switching box to be installed in the cab of the vehicle;

FIG. 6 is a perspective view of a transmitter;

DETAILED DESCRIPTION OF THE INVENTION

Figure 1:
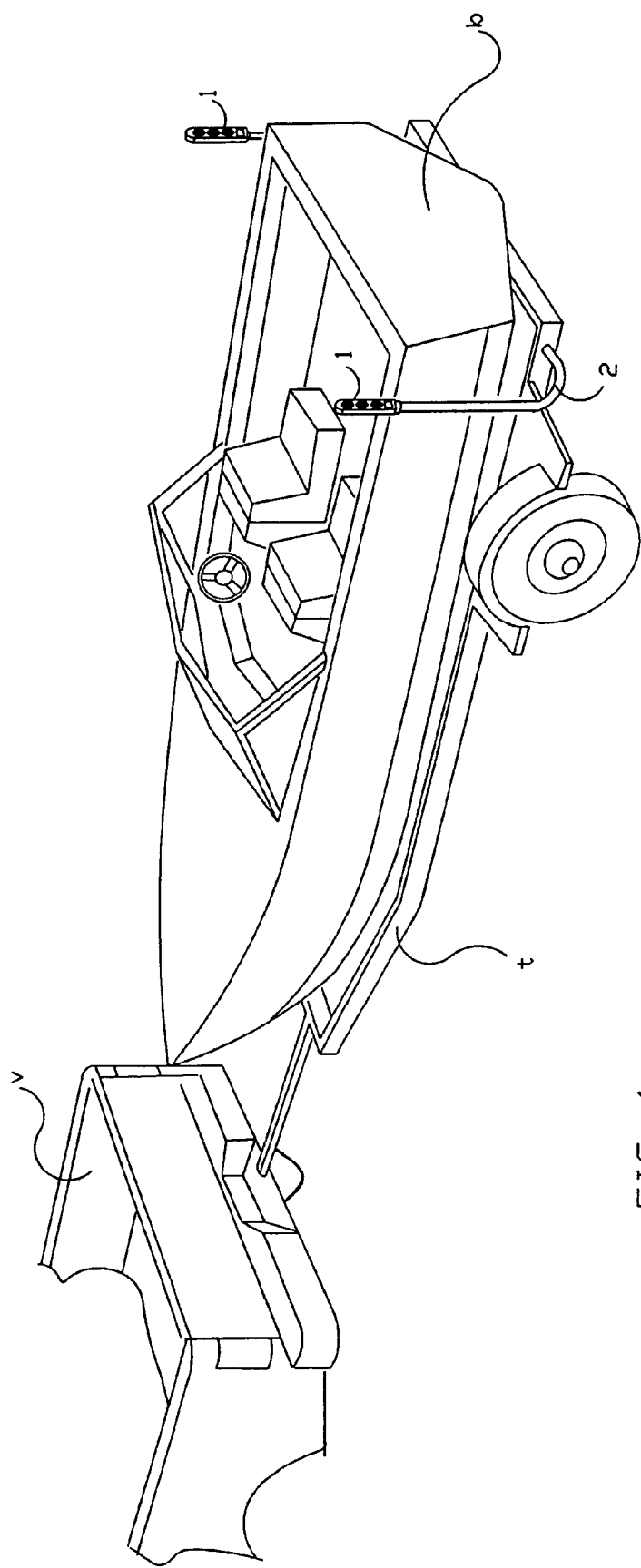
FIG. 1 is a perspective view of a boat trailer being towed.

FIG. 1 is a perspective view of a towing vehicle and trailer combination. The vehicle is designated is V and the trailer is identified as t. The trailer has upstanding light tubes 2 with a light system 1 attached at each upper end of the upstanding tubes 2. The boat b to be carried by the trailer t is shown in a perspective view.

Figure 2:
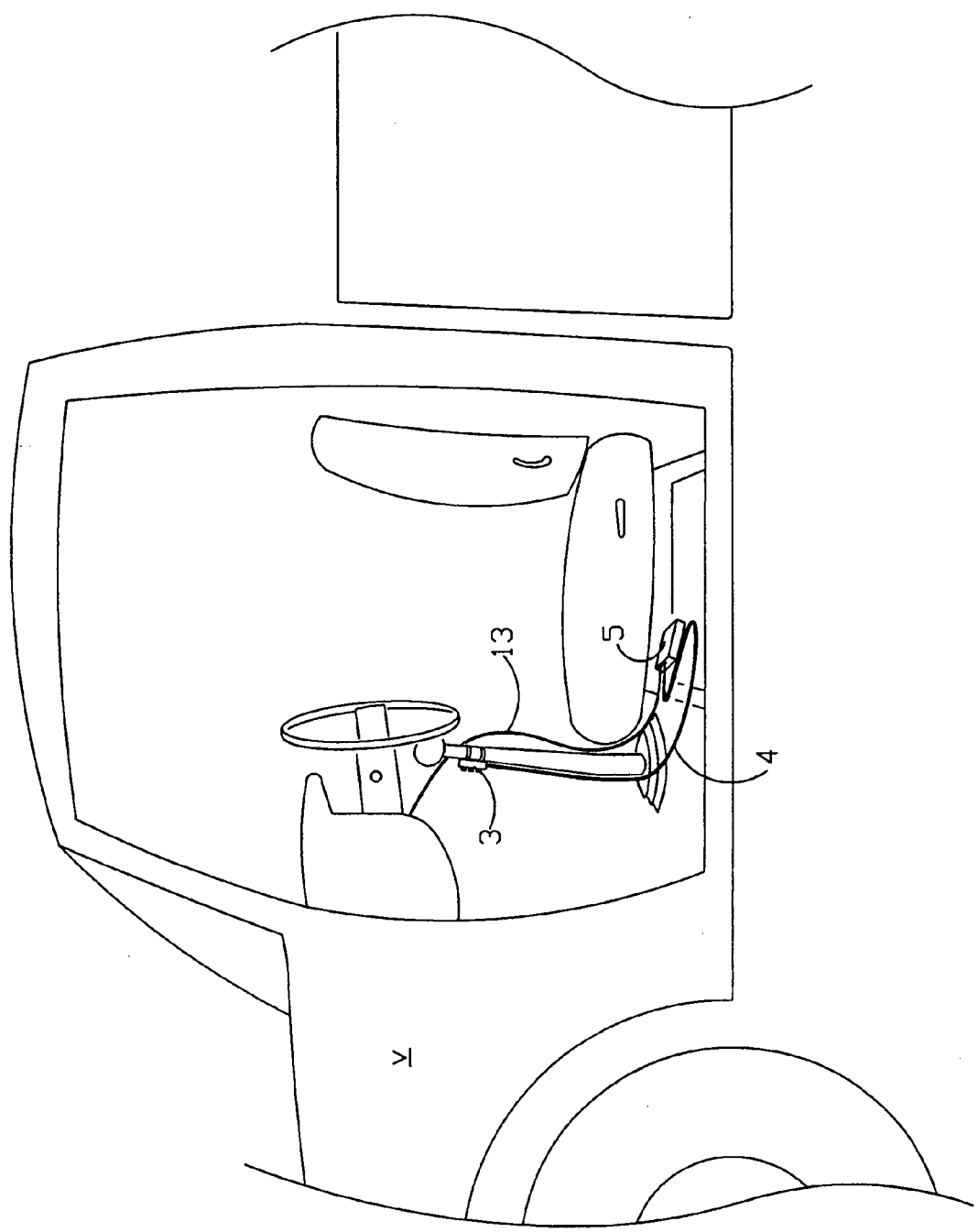
FIG. 2 shows wiring inside a cab of a towing vehicle.

FIG. 2 illustrates an interior of the cab of a vehicle V. On the stick shift there is mounted a switch 3 having an extension wire 4 leading therefrom to a transmitter 5. The transmitter 5 will direct the current needed to illuminate the rear lights 1 (FIG. 1) from one source of electricity to another. The normal light system is derived from a cigarette lighter to be swichtable in the transmitter 5 to another source of electricity such as the battery of the vehicle as will be described below.

FIG. 3 shows a detail of the emergency light unit 1 having at least three lights installed therein. The at least three lights can be illuminated by regular light bulbs or by the well known LED lights. The light unit 1 is powered by batteries 7 in a compartment. The bottom of the light unit has a flange 9 thereon so that it can be attached to other elements such as the upstanding pipe or rod 2 in FIG. 1.

FIG. 4 is a perspective view of the light unit 1 of FIG. 3. The batteries 7 of FIG. 3 have received a cover 8 in this FIG. 4. This light unit 1 also has an electrical socket 11 therein for receiving electrical power from a source 12 other than the batteries 7. There is also a switch 15 which will turn the power off and on from any source of power.

FIG. 5 illustrates the switch 3 which is mounted on the gear shift column as shown in FIG. 2. The connecting cable 4 coming from the switch 3 will be plugged into the transmitter 5 (FIG. 6) by way of the plug-in 16. An adjacent plug-in 14 in FIG. 6 will transmit an electrical signal to the light unit 1 (FIG. 1) at the rear of the trailing vehicle t.

FIG. 6 illustrates the transmitter unit 5 with the various connections. The transmitter unit 5 can be located in the towing vehicle or on the trailing vehicle T. The power supply line 13 supplies 12 V power to the transmitter by way of the plug-in 14. An adjacent plug-in 16 receives power from the switching device 3 by way of lines 4 (FIG. 5).

It should be noted that each light unit on the trailing vehicle T has the same type of connections.

Figure 7:
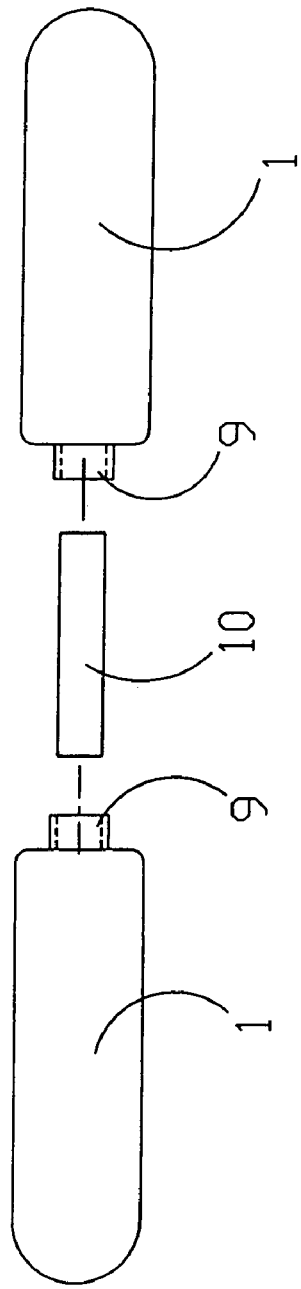
FIG. 7 illustrates two light units that may be separated from each other.

FIG. 7 illustrates as to how two light units 1 can be combined so that the combined light units 1 can be mounted in a different manner from that shown in FIG. 1. The combined light units could be mounted in a horizontal manner such as on tailgate of a pickup vehicle or at the back of an SUV or van. There is a connector shown at 10 which would extend the distance between the light units 1 to any desired extent.

Figure 8:
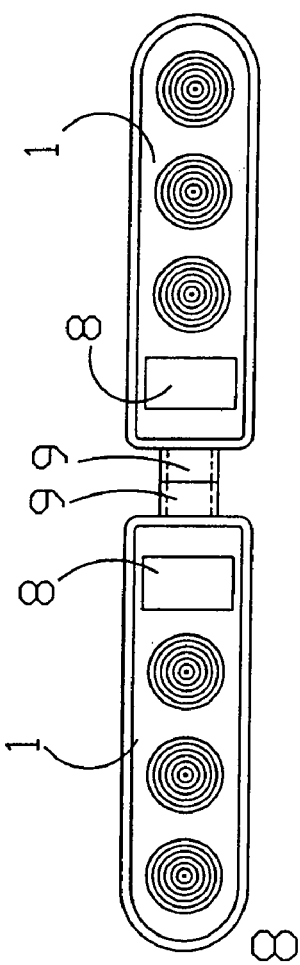
FIG. 8 shows two light units in tandem.

FIG. 8 illustrates a situation wherein two light units 1 are combined into a switch to a secondary source of power, so that the rear lights of the towed vehicle continue to operate.

In view of all of the above, it can now be seen that the inventive lights are quite versatile in an emergency when the regular lights cannot operate any longer after having been immersed in water and any further travel of the vehicle would be prohibited in regular traffic. It is merely up to the operator of the towing vehicle to switch to a secondary source of power, so that the rear lights of the towed vehicle continue to operate.

What is claimed is:

1. An emergency lighting system adapted to be used on a vehicle to be: towed consisting of a lighting unit, said lighting unit is connected to a source of power commensurate with a first vehicle towing said vehicle, a transmitter unit being interposed between said first vehicle and said towed vehicle, said transmitter having means thereon for switching a source of power from said first vehicle to another source of power on said towed vehicle.

2. The emergency lighting system of claim 1, including a flexible connection between said first and said towed vehicle.

3. The emergency lighting system of claim 1, wherein said lighting unit is self-contained.

4. The emergency lighting system of claim 1, wherein several lighting units are combined in a single unit.

5. The emergency lighting system of claim 4 including an extension placed between at least two of said units.

* * * * *